A. ROGERS.
OPERATING HANDLE.
APPLICATION FILED JAN. 19, 1914.

1,174,448.

Patented Mar. 7, 1916.

Witnesses:
Walter P. Abell
Elizabeth L. Robinson

Inventor
Alfred Rogers
by his Attorneys

UNITED STATES PATENT OFFICE.

ALFRED ROGERS, OF MILTON, MASSACHUSETTS, ASSIGNOR TO THE DECECO COMPANY, OF BOSTON, MASSACHUSETTS, A CORPORATION OF RHODE ISLAND.

OPERATING-HANDLE.

1,174,448.   Specification of Letters Patent.   Patented Mar. 7, 1916.

Application filed January 19, 1914. Serial No. 812,912.

*To all whom it may concern:*

Be it known that I, ALFRED ROGERS, a citizen of the United States, and resident of Milton, in the county of Norfolk and State of Massachusetts, have invented certain new and useful Improvements in Operating-Handles, of which the following is a specification.

The object of the present invention is to provide an operating handle composed of non-corrosive material adapted to be used where corrosive elements are present. For example, in bath-rooms and water-closets the splashings from the bowls and tubs frequently contain corrosive substance which will attack nickel-plated or other metal trimmings and permanently discolor them and eat away the plating.

To avoid this undesirable corrosion I have devised a structure comprising a handle of non-corrosive material, such as porcelain, and a shank or stem affixed thereto for operating the valve or other element for which the handle is used as an actuator, the structure being so organized that no metal is exposed where the splashings from the bowls or tubs may lodge.

Figure 1:
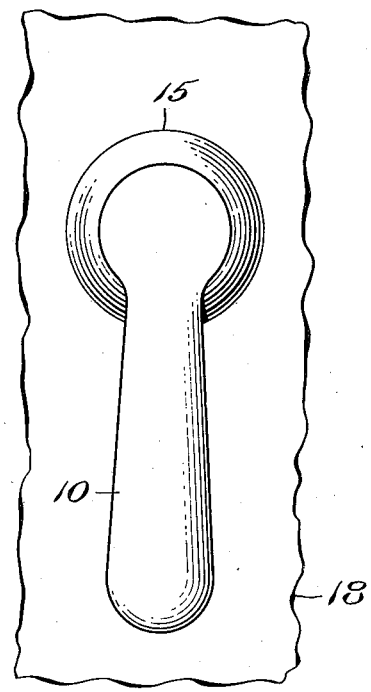
Figure 2:
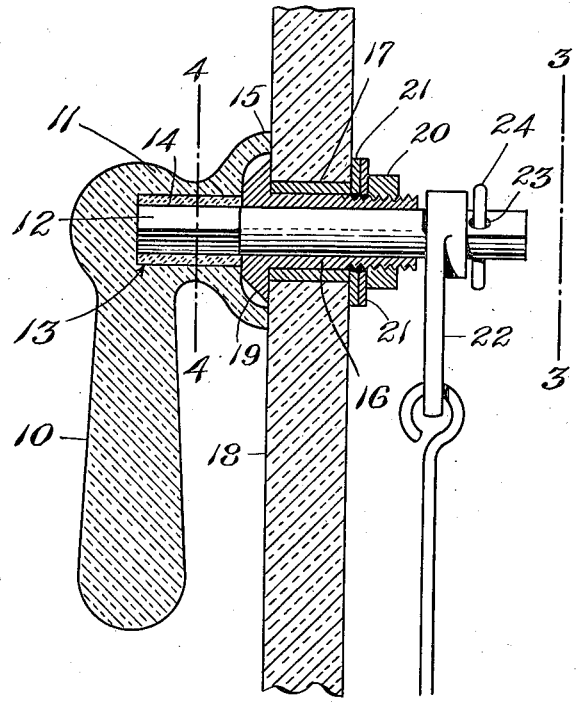
Figure 3:
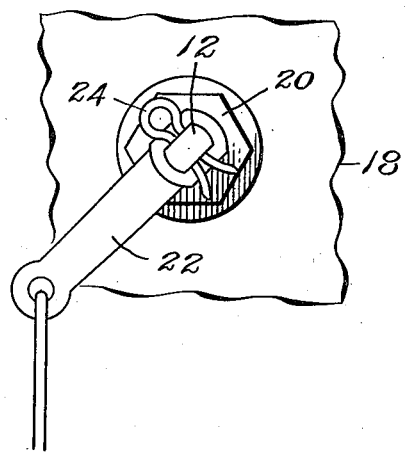
Figure 4:
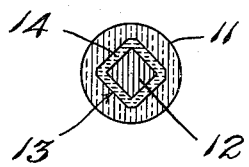

Of the accompanying drawings, which illustrate one form in which my invention may be embodied: Figure 1 represents a front elevation of an operating handle. Fig. 2 represents a vertical section through the same, as mounted upon the wall of a flushing tank. Fig. 3 represents an elevation of the device from the point of view indicated by line 3—3 of Fig. 2. Fig. 4 represents a cross section through the structure intersected by line 4—4 of Fig. 2.

The same reference characters indicate the same parts wherever they occur.

The handle, indicated at 10, is composed of any suitable non-corrosive material, such as porcelain. It is in the form of a lever and has a hub 11 in which a metal stem or shank 12 is secured. The hub 11 is formed with a socket 13 for the reception of the stem, the socket being preferably angular in cross section, as shown by Fig. 4, for a purpose which will be understood after further description. The end of the stem which is arranged in the socket is also preferably angular in cross section, as shown by Fig. 4, and is secured by suitable cement or plaster 14. I use a mixture of glycerin and litharge for securing the stem in the hub,—this mixture, when hard, adhering to both porcelain and metal, so that the handle and stem become, to all intents and purposes, a unit. The angular formation of the socket 13 and stem 12 enables the plaster 14 to transmit rotative movement from the hub to the stem positively, and does not depend upon the adhesive quality of the plaster. The hub is formed with an annular flange 15 which is arranged to lie in close relation to the support in which the stem 12 is arranged.

As shown by Fig. 2, the stem is mounted in a metal bushing 16, and this bushing is arranged in a bushing 17 of softer material, such as wood fiber, the whole assemblage being mounted in a hole extending through a support 18. This support may, in the present instance, represent a wall of a flushing tank, the whole structure illustrated being designed for operating the flushing valve of the flushing tank. The metal bushing 16 has a head 19 at one end and is screw-threaded at the other end to receive a nut 20. Suitable washers 21 are arranged between the nut and the wall 18.

The inner end, that is, the right-hand end, of the stem 12 is formed for connection with a lever 22. (See Fig. 3). The coöperative portions of the stem and lever have flat faces, as shown by Fig. 3, whereby rotative movement of the stem will be imparted to the lever. The stem is provided with a hole 23 for the reception of a cotter pin 24 to secure the lever upon the stem. The cotter pin and lever thus serve to hold the stem so that it will not be withdrawn from the bushing 16, and the porcelain flange is thus held in contiguous relation to the wall 18. This wall is usually, and is in the present instance, composed of non-corrosive material, such as porcelain. The porcelain handle and flushing tank thus inclose all the metal parts and prevent access of corroding elements to the metal.

The phrase "contiguous relation" as applied in the specification and claims to the flange 15 and wall 18 does not necessarily imply actual contact, but means such close relation as to preclude a space which would render the metal parts visible.

I claim:

1. An operating device consisting of a unitary body of vitrified material having a hub portion, a lever portion adjoining said hub portion, a socket in said hub portion to receive one end of a transmission shaft or stem, and an annular flange adjoining said hub portion and arranged to surround such shaft or stem as aforesaid, the internal diameter of said flange being substantially greater than the diameter of said socket to provide an annular space to receive a bearing member for such shaft or stem.

2. The combination with a flushing tank, of valve-operating means comprising a rotatable stem extending through a wall of said tank, a bearing bushing for said stem arranged in said wall and having a peripheral flange arranged against the outer side of said wall, and a handle of non-corrosive material arranged upon the exterior of said tank, said handle having a socket and the outer end of said stem being secured in said socket, said handle having an annular flange inclosing said peripheral flange and lying in contiguous relation to said tank.

In testimony whereof I have affixed my signature, in presence of two witnesses.

ALFRED ROGERS.

Witnesses:
WALTER P. ABELL,
P. W. PEZZETTI.